Patented July 13, 1948

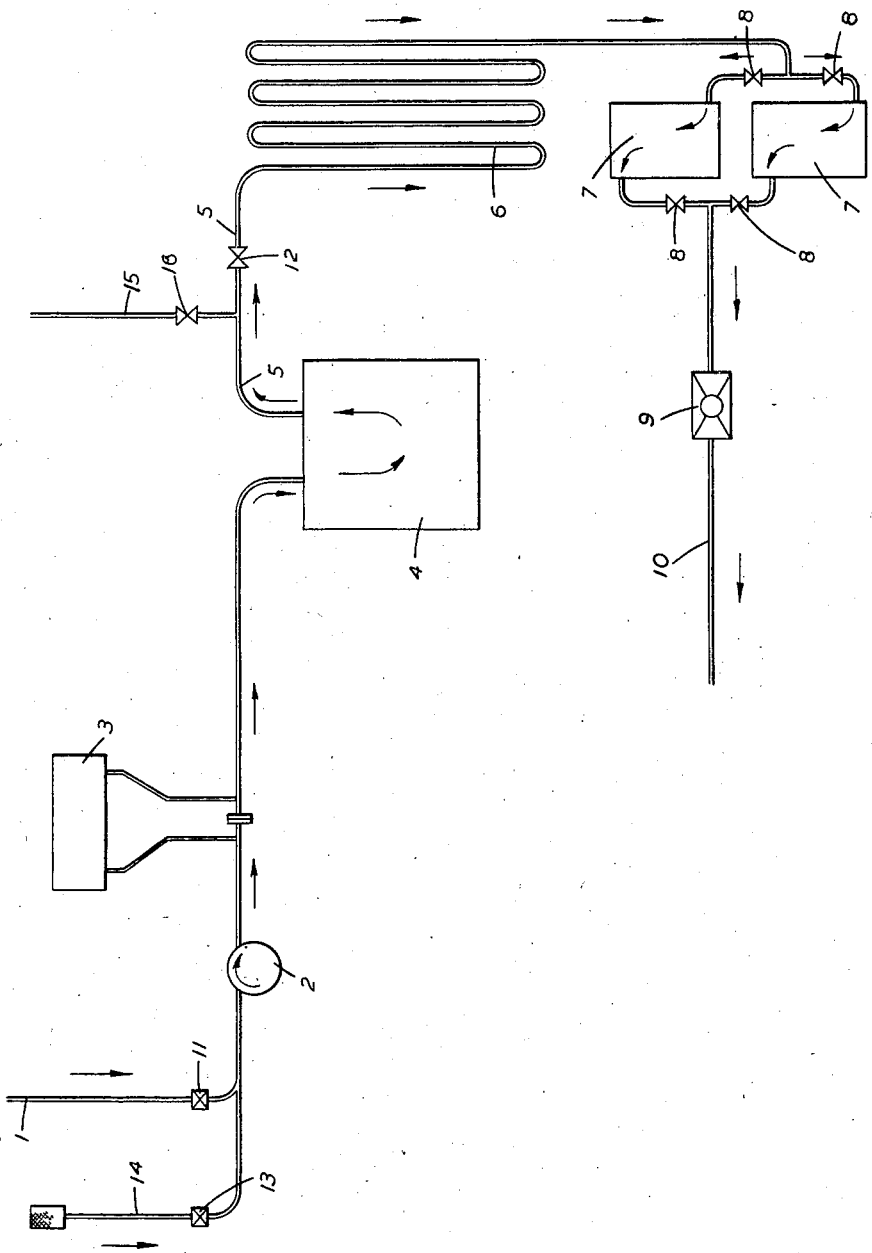

2,444,930

UNITED STATES PATENT OFFICE 2,444,930

BARIUM CARBONATE-ASBESTOS CATALYST AND PREPARATION THEREOF

Frederick Wardle Haywood and Douglas Stuart Laidler, Watford, England, assignors of one-half to Wild-Barfield Electric Furnaces Limited, Watford, England Application August 30, 1945, Serial No. 613,572
In Great Britain February 28, 1945

6 Claims. (Cl. 252—205)

This invention is for improvements in or relating to the removal of carbon dioxide from industrial carbonaceous gases and has for an object to provide a catalyst and a process for the removal of carbon dioxide, oxygen and sulphur-containing gases from industrial gases such as town's gas and other carbonaceous gases used in industry for the formation for example of carburising atmospheres for the treatment of ferrous alloys.

The constituents in such industrial gases which are the most valuable for effecting carburising are carbon monoxide and methane and the removal of carbon dioxide and oxygen from gases containing also carbon monoxide and methane has presented a problem of some difficulty since the destruction of carbon monoxide and methane is wholly undesirable.

It is known that salts of the alkaline earth metals, supported upon refractory materials and carbonaceous carriers will effect the removal of carbon dioxide and oxygen from the industrial gases referred to above, but the utilisation of such a catalyst in an industrial process presents certain difficulties both in use and in regeneration.

According to the present invention there is provided a catalyst comprising a water insoluble alkaline earth metal salt or mixture thereof extended with fibrous substantially iron-free asbestos. The catalyst is preferably prepared in the form of lenticular or lamellar shapes so as to present the greatest possible effective area of catalyst to the gas stream without at the same time imposing an undue resistance to gaseous flow. Preferably the ratio of the alkaline earth metal salt to the asbestos is of the order of 2:1 by weight.

The catalyst of the present invention is particularly effective for the removal of carbon dioxide and oxygen and will also remove the greater part of sulphur-containing gases contained in the industrial gases referred to and the following table illustrates the analysis of an average town's gas before and after passage over the catalyst of the invention, the figures quoted being stated as percentages by volume:

| Gas | CO$_2$ | O$_2$ | C$_n$H$_n$ | CO | CH$_4$ | H$_2$ | N$_2$ (balance) |
|---|---|---|---|---|---|---|---|
| Gas Analysis: | | | | | | | |
| Untreated | 3.3 | 0.6 | 2.5 | 16.7 | 23.8 | 48.6 | 4.5 |
| Treated | 0.0 | 0.0 | 0.6 | 21.0 | 23.8 | 49.5 | 5.1 |

The percentage figures quoted in the table above are average figures taken from 80 analyses spread over a period of 8 to 9 months.

The analysis of town's gas for supplies in the U. K. may usually be taken to fall within the following limits:

| | Per cent |
|---|---|
| Carbon dioxide | 2 – 5 |
| Oxygen | 0.5– 1 |
| Unsaturated hydrocarbons | 1.5– 3.5 |
| Carbon monoxide | 14 –20 |
| Methane | 15 –30 |
| Hydrogen | 45 –55 |

The balance being nitrogen.

In use the catalyst is charged into a catalyst chamber and the gases passed over the catalyst, preferably by passing them through a catalyst bed in the chamber, whilst maintaining the catalyst at a temperature of about 900° C.

The catalyst has a very satisfactory life and is readily regenerated by passing air over the exhausted catalyst.

The invention further includes a method of manufacturing a catalyst which comprises forming a slurry of a water insoluble alkaline earth metal salt with water containing a binder, incorporating fibrous substantially iron-free asbestos into said slurry, removing water therefrom, preferably by heating at a temperature of about 100° C. and thereafter igniting the mixture in air at a temperature such that preferably sintering or incipient sintering of said alkaline earth metal salt is effected; the temperature of ignition is preferably about 900° C.

The following is a description by way of example of one method of carrying the invention into effect:

3 lbs. barium carbonate of good commercial quality in the form of fine powder was made into a slurry with an aqueous solution of glue. 1½ lbs. Gooch asbestos was thoroughly saturated with this slurry and the asbestos so treated was then teased into thin flakes of the order of ½ inch to 1 inch in diameter and of the minimum thickness necessary to enable the flakes to retain their shape. The flakes were then dried in a current of air at about 100° C. and thereafter ignited in air at a temperature of 900° C. in order to achieve a slight pre-sintering of the barium carbonate.

After ignition, the catalyst was allowed to cool in air and the flakes were then separated and packed lightly into a container. The container should be of a non-carburisable or difficultly carburisable heat-resistant material.

In use, the catalyst in the container is placed in a furnace and heated to a temperature of the order of 900° C. whereafter town's gas is led through the catalyst container. The useful life of the catalyst between regenerations for the treatment of town's gas of the analysis quoted in the table given above is 120 hours for a gas flow of 50 cubic feet per hour. Under the conditions specified it will be appreciated that after this time the catalyst is still capable of removing most of the carbon dioxide and oxygen but not to completion.

Under practical conditions of working, the temperature of the treatment does not vary greatly from 900° C.: the quantity of catalyst and the temperature used for a given gas flow are such as, subject to a required useful life before regeneration, will remove the $CO_2$ and $O_2$ effectively without destroying considerable amounts of methane. Practical examples will serve to indicate the permissible temperature variation. Using the quantity of catalyst obtained by the procedure of the above example in a container of a volume of from ¼ to ⅓ ft.$^3$, at 900° C. destruction of methane is negligible with a gas flow as low as 10 ft.$^3$/hr. If lower gas rates used then the temperature should be reduced, say to 850–875° C. Carbon dioxide and oxygen are still removed but the methane will crack if the temperature is not reduced, e. g. at 5 ft.$^3$/hr., 2% of $CH_4$ destroyed at 900° C., no $CH_4$ cracking at 850° C.

On the other hand if the gas flow is 50 ft.$^3$/hr., then at 900° C. the $CO_2$ and $O_2$ are completely removed, without $CH_4$ cracking, but at 850° C. the residual $CO_2$ will be of the order of 0.5 to 0.6%.

The upper limit of the temperature is again dictated by the gas flow used, e. g. at 950° C. some 2% of the $CH_4$ will crack if the gas flow is 50 ft.$^3$/hr. but cracking is negligible if the gas flow is 80–100 ft.$^3$/ hr. or more.

For gas flows higher than 100 ft.$^3$/hr. the maximum temperature could be increased safely to 975° C. or more without appreciable $CH_4$ destruction and to give good $CO_2$ and $O_2$ removal.

The regeneration of the catalyst is readily effected by leaving the furnace heating conditions unaltered, or substantially unaltered, and passing a stream of air over the catalyst preferably through the catalyst bed at such a rate of flow that the catalyst at the inlet end, i. e. that end which the incoming air first meets, does not rise above 1100° C. The rise in temperature is due to exothermic reactions taking place during the regeneration of the catalyst.

The time of regeneration is of the order of 3 to 4 hours and will naturally depend upon the degree of fouling or exhaustion of the catalyst.

After regeneration and when raw town's gas is the gas undergoing treatment, there is a time lag usually of about 1 hour before the effluent gas from a catalyst container can be used with safety for gas carburising.

It is important that all metal parts with which the gases come into contact, such as the inlet and outlet pipes, the grids, supports, thermocouple sheath tubes, baffles and other parts of the catalyst container should be constructed of the difficultly carburisable heat-resistant materials referred to above. The reason for this is that traces of iron lead to a diminution in the methane and carbon monoxide content of the gases and it is this effect which has presented difficulties in prior processes for the removal of carbon dioxide and oxygen from this class of industrial gas.

An alternative method of preparation of the catalyst is now exemplified and this consists in thoroughly soaking 1½ lbs. of Gooch asbestos in a dilute aqueous solution of glue. The moistened asbestos is then teased out into the thin flakes described above and these thin flakes are then dipped into 3 lbs. of dry powdered barium carbonate, which latter is thoroughly worked into the damp mass of asbestos. The further treatment of the catalyst to prepare it for use is the same as described above.

The ratio of alkaline earth metal salt to asbestos may be varied widely but it is desirable to incorporate as much of the alkaline earth metal salt into the catalyst as is possible without utilising so much as will lead to a tendency for the catalytic salt to flake off from the asbestos during use; any tendency of the catalytic salt to flake off from the asbestos during use will tend to choke up the catalyst container and lead to an undue increase in the resistance to gaseous flow through the catalyst container.

The accompanying diagrammatic drawing illustrates the following brief description of a plant for the treatment of town's gas to provide a carburising atmosphere for the treatment of ferrous alloys.

The coal gas is led through an intake pipe 1 to a compressor 2 wherein it is compressed and led through a flow meter 3 to the catalyst container described above, disposed within an electrically or otherwise suitably heated furnace generally indicated at 4, this furnace being adjusted to give a temperature of the order of 900° C. The outlet 5 from the catalyst container is taken via a cooler 6 to a drying tower in this case packed with silica gel, there being two drying towers 7 arranged in parallel with appropriate valves 8 so that the driers may be used alternately, one being in use whilst the other is being regenerated. From the drying towers the gas is passed through an integrating meter 9 by pipe 10 to the gas carburising furnace or the like, where it is to be used. In order to permit of regeneration of the catalyst, valves 11, 12 are inserted respectively in the gas inlet to the compressor and in the gas outlet from the catalyst chamber so as to isolate those elements of the apparatus from the rest of the plant and a valve 13 in a second inlet pipe 14 to the compressor is operated so that the compressor can aspirate air and pass it into the catalyst container. An outlet pipe 15 from the catalyst container (for convenience of definition referred to hereinafter as an air outlet) is opened by operating valve 16 to allow the gases from the regeneration treatment to escape.

Whilst the foregoing description has been primarily directed to the treatment of town's gas it will be understood that it can be successfully operated to treat gases used in industry for the preparation of carburising atmospheres.

We claim:

1. A catalyst for the treatment of carbonaceous industrial gases consisting essentially of barium carbonate extended with fibrous substantially iron-free asbestos.

2. A catalyst as in claim 1, wherein the ratio of barium carbonate to asbestos is of the order of 2:1 by weight.

3. A method of manufacturing a catalyst comprising the incorporation of barium carbonate with substantially iron-free fibrous asbestos, water and a binder, removing water therefrom and thereafter igniting the mixture in air.

4. A method of manufacturing a catalyst comprising forming a slurry of barium carbonate with water containing a binder, incorporating substantially iron-free fibrous asbestos into said slurry, removing water therefrom and thereafter igniting the said mixture in air.

5. A method of manufacturing a catalyst comprising soaking substantially iron-free asbestos in water containing a binder, and working powdered barium carbonate into the damp mass, removing water therefrom, and thereafter igniting the mixture in air.

6. A method of manufacturing a catalyst comprising the incorporation of barium carbonate with iron-free asbestos, water and a binder, removing water therefrom and thereafter igniting the mixture in air at a temperature such that incipient sintering of the said barium carbonate is effected.

FREDERICK WARDLE HAYWOOD.
DOUGLAS STUART LAIDLER.

REFERENCES CITED

The following references are of record in the file of this patent:

UNITED STATES PATENTS

| Number | Name | Date |
|---|---|---|
| 480,312 | Amend et al. | Aug. 9, 1892 |
| 1,592,649 | Sperr, Jr. | July 13, 1926 |
| 1,914,557 | Craver | June 20, 1933 |
| 1,960,212 | Walker | May 22, 1934 |
| 2,081,272 | Foster | May 25, 1937 |
| 2,150,797 | Clayton et al. | Mar. 14, 1939 |
| 2,214,926 | Guthrie et al. | Sept. 17, 1940 |

FOREIGN PATENTS

| Number | Country | Date |
|---|---|---|
| 23,753 | Great Britain | Jan. 7, 1926 |

OTHER REFERENCES

Chemistry of Pulp and Paper Making, Sutermeister, Wiley and Sons, 1941, page 330.